(12) United States Patent
Lynn (10) Patent No.: US 7,952,484 B2
(45) Date of Patent: *May 31, 2011

(54) ENTERTAINING OR ADVERTISING HYGIENE APPARATUS

(75) Inventor: John M. Lynn, Austin, TX (US)

(73) Assignee: Hygiene Screen LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/836,278

(22) Filed: Jul. 14, 2010

(65) Prior Publication Data

US 2010/0282773 A1    Nov. 11, 2010

Related U.S. Application Data

(63) Continuation of application No. 11/323,759, filed on Dec. 30, 2005, now Pat. No. 7,782,214.

(60) Provisional application No. 60/640,671, filed on Dec. 31, 2004, provisional application No. 60/697,126, filed on Jul. 7, 2005, provisional application No. 60/697,049, filed on Jul. 6, 2005.

(51) Int. Cl.
G08B 23/00 (2006.01)

(52) U.S. Cl. .................... 340/573.1; 340/572.1

(58) Field of Classification Search ............... 340/573.1
See application file for complete search history.

(56) References Cited

U.S. PATENT DOCUMENTS

| | | | |
|---|---|---|---|
| 1,491,780 A | 4/1924 | Abbott | 292/347 |
| 1,783,097 A | 11/1930 | Polcari | 292/347 |
| 2,527,955 A | 10/1950 | Pagel | 422/297 |
| 3,314,746 A | 4/1967 | Millar | 422/186 |
| 3,967,478 A | 7/1976 | Guinn | 70/144 |
| 4,431,628 A | 2/1984 | Gaffar | 424/7.1 |
| 4,534,194 A | 8/1985 | Aydin | 70/278 |
| 4,688,585 A | 8/1987 | Vetter | 134/56 |
| 4,832,942 A | 5/1989 | Crace | 428/41.1 |
| 4,856,140 A | 8/1989 | Visco et al. | 16/412 |
| 4,896,144 A | 1/1990 | Bogstad | 340/573 |
| 4,992,256 A | 2/1991 | Skaggs et al. | 424/9.71 |
| 5,043,013 A | 8/1991 | Kluger et al. | 106/31.32 |
| 5,199,188 A | 4/1993 | Franz | 34/105 |
| 5,202,666 A | 4/1993 | Knippscheer | 340/573 |
| 5,314,668 A | 5/1994 | Biermaier | 422/292 |
| 5,337,588 A | 8/1994 | Chhatwal | 70/278 |
| 5,475,966 A | 12/1995 | Renfrow | 53/381.1 |
| 5,609,051 A | 3/1997 | Donaldson | 70/278 |
| 5,610,589 A | 3/1997 | Evans et al. | 340/573 |
| 5,670,945 A | 9/1997 | Applonie | 340/573 |
| 5,810,201 A * | 9/1998 | Besse et al. | 222/39 |

(Continued)

OTHER PUBLICATIONS

Joel Durham Jr., The Digital Home: The Bathroom, PC Magazine, http://www.pcmag.com/article2/0,2817,1729711,00.asp Nov. 18, 2004.

(Continued)

Primary Examiner — George A Bugg
Assistant Examiner — Kerri McNally
(74) Attorney, Agent, or Firm — John M. Lynn (57) ABSTRACT

A method and apparatus are disclosed which involve an improved way to coerce use of a soap dispenser (or other hygiene device). A soap dispenser according to at least one embodiment, includes a teaching or entertaining device that is fun and informative that is triggered when the soap dispenser is utilized. The soap dispenser may also be utilized as an advertising tool.

20 Claims, 5 Drawing Sheets

U.S. PATENT DOCUMENTS

| | | | | |
|---|---|---|---|---|
| 5,812,059 | A | 9/1998 | Shaw et al. | 340/573.1 |
| 5,864,288 | A | 1/1999 | Hogan | 340/568.1 |
| 5,870,015 | A | 2/1999 | Hinkel | 340/573.1 |
| 5,882,667 | A | 3/1999 | Jones | 424/405 |
| 5,925,103 | A | 7/1999 | Magallanes et al. | 709/230 |
| 5,945,910 | A | 8/1999 | Gorra | 340/573.1 |
| 6,031,461 | A | 2/2000 | Lynn | 340/573.1 |
| 6,125,482 | A * | 10/2000 | Foster | 4/623 |
| 6,211,788 | B1 | 4/2001 | Lynn et al. | 340/573.1 |
| 6,236,317 | B1 | 5/2001 | Cohen et al. | 340/573.1 |
| 6,315,163 | B1 | 11/2001 | Shu | 222/39 |
| 6,349,851 | B1 | 2/2002 | Lu | 222/39 |
| 6,560,027 | B2 * | 5/2003 | Meine | 359/630 |
| 6,577,240 | B2 | 6/2003 | Armstrong | 340/573.1 |
| 6,578,728 | B1 | 6/2003 | Weigen | 221/2 |
| 6,644,046 | B2 | 11/2003 | Roh et al. | 62/126 |
| 6,727,818 | B1 | 4/2004 | Wildman et al. | 340/573.1 |
| 6,807,574 | B1 | 10/2004 | Partovi et al. | 709/224 |
| 6,832,916 | B2 | 12/2004 | Collopy | 434/236 |
| 6,883,563 | B2 | 4/2005 | Smith | 141/94 |
| 6,956,498 | B1 | 10/2005 | Gauthier et al. | 340/840.69 |
| 2002/0058239 | A1 | 5/2002 | Wang | 434/263 |
| 2002/0092012 | A1 | 7/2002 | Shah | 717/170 |
| 2002/0135486 | A1 | 9/2002 | Brohagen et al. | 340/573.1 |
| 2003/0101255 | A1 | 5/2003 | Green | 709/223 |
| 2003/0182396 | A1 | 9/2003 | Reich et al. | 709/218 |
| 2004/0054667 | A1 | 3/2004 | Kake | 707/3 |
| 2004/0256456 | A1 * | 12/2004 | Coughlin et al. | 235/382 |
| 2005/0134465 | A1 * | 6/2005 | Rice et al. | 340/573.1 |
| 2005/0171634 | A1 * | 8/2005 | York et al. | 700/231 |
| 2005/0278882 | A1 | 12/2005 | Drzewiecki et al. | 15/105 |
| 2006/0071799 | A1 | 4/2006 | Verdiramo | 340/573.1 |

OTHER PUBLICATIONS http://www.cdc.gov/features/handwashing; "Wash Your Hands"; pp. 2, Jun. 22, 2009.

http://archives.cnn.com/2002/HEALTH/07/22gupta.germs.hiv.otsc/index.html; "Dr. Sanjay Gupta: Alarm About Hospital Germs"; pp. 2, Jun. 22, 2009.

http://ergoweb.com/news/detail.cfm?id=2112; "Canada Launches Hand-Washing Campaign to Cut Hospital Infections"; pp. 2, Jun. 22, 2009.

http://seattletimes.nwsource.com/html/localnews/2008396215_mrsadayl.html; "How Our Hospitals Unleashed a MRSA Epidemic"; pp. 9, Jun. 22, 2009.

http://www.bfhd.wa.gov/forms/brochures/BFHD-E-0001.pdf; "Handwashing"; pp. 2, Jun. 22, 2009.

Philips Research—Mirro TV, http://www.research.philips.com/technologies/display/mrrordisp/mirrortv/, (via http://www.internetarchive.org), Nov. 17, 2004.

Fun Trivia, http://www.funtrivia.com (via http://internetarchive.org), Feb. 26, 2000.

PC World, "Can Your Refrigerator Surg?" by Eileen Smith (http://www.pcworld.com/article/14675/can_your_refrigerator_surf.html), Jan. 6, 2000.

MSN ENCARTA Dictionary definition of—Entertain—, http://encarta.msn.com, Jul. 22, 2008.

* cited by examiner

ENTERTAINING OR ADVERTISING HYGIENE APPARATUS

CROSS REFERENCE TO RELATED APPLICATIONS

This application is a continuation application of U.S. patent application Ser. No. 11/323,759 filed Dec. 30, 2005 now U.S. Pat. No. 7,782,214; which claims priority under 35 U.S.C. §119(e) to U.S. Provisional Patent Application Ser. No. 60/640,671 filed Dec. 31, 2004 U.S. Provisional Patent Application Ser. No. 60/697,049 filed Jul. 6, 2005 and U.S. Provisional Patent Application Ser. No. 60/697,126 filed Jul. 7, 2005 . The contents of these applications are hereby incorporated by reference in its entirety.

TECHNICAL FIELD OF THE DISCLOSURE

The present disclosure relates in general to hygiene apparatuses, (e.g. soap dispensers, toothbrushes, or the like), and more particularly to hygiene apparatuses that teach interesting facts/trivia to users of the dispenser, or otherwise entertain them. The devices may also be used as an advertising tool.

BACKGROUND OF THE DISCLOSURE

There is a great desire that people wash their hands more frequently. The U.S. Center for Disease Control has stated that one of the most important things you can do to keep from getting sick is to wash your hands. And yet, many people, through lack of knowledge, poor habits or simple negligence, do not wash their hands frequently enough.

Because of the importance to overall health and the failure of many people to wash their hands frequently enough, various hand washing systems have been developed, but have focused mostly on institutional environments. These systems are typically very complex and, accordingly, prohibitively expensive and most importantly they typically require a retrofitting of the wash area. One system, for example, includes a sanitizing basin with moisture proof switches and proximity detectors. A person must insert both hands simultaneously into the sanitizing basin in order to initiate the desired output signal. Other systems rely on complex electronics, timing devices, location sensors, pumps, or complex combinations of these and similar items in complex attempts to require hand washing.

Since many presently available systems are expensive, complex to install, difficult to maintain or difficult use, an improved hand washing system is desirable.

SUMMARY OF THE DISCLOSURE

There is a need for a simple, inexpensive method to help assure that people wash their hands more frequently. Especially desirable is a system that is simple, inexpensive and/or does not require retrofitting of wash areas.

In accordance with an embodiment of the present disclosure, a method and apparatus are disclosed for helping to coerce more frequent washing of hands that provide advantages over prior sanitization assurance schemes.

According to one aspect of the present disclosure, a method for helping to assure washing of hands preferably involves a soap dispenser which includes an information sharing device to help teach or communicate to users interesting facts/trivia/ educational information or entertainment content as they use the dispenser. It may be that some of the information may be related to hand washing (or tooth brushing) but these facts/ trivia, etc. need not be related to hand washing (or tooth brushing) and are simply designed to be entertaining, fun and/or informational. In order to remain interesting, there may be a large variety of different individual packets of digital information to be shared with the user(s). "Large variety" means at the very least a hundred or more different pieces of information (e.g. trivia questions and answers, jokes, music clips, etc.) and more preferably many hundreds or even many thousands of different individual packets of digital information.

Many people love games and gadgets that teach them interesting facts (as an example, the game Trivial Pursuit® was a huge commercial hit). The information sharing and/or entertaining device can turn a mundane task (i.e. washing one's hands or tooth brushing) into a fun and/or learning experience. For adults it may be possible to have a Trivial Pursuit® type dispenser, a vocabulary teaching dispenser or a dispenser focused on some other particular body of information or education (e.g. trivia based on a very popular movie, sports team, or TV show).

In one embodiment, a soap dispenser may help adults (or children) learn a foreign language. In another embodiment a soap dispenser may help a child learn mathematics. On the other side of the information sharing spectrum from mathematics, it may be desirable to have a joke telling soap dispenser. In short, a teaching/entertaining soap dispenser can result in both improved hygiene and be an educational or fun experience at the same time.

The information shared by the soap dispenser, toothbrush, or other hygiene device may be segregated into a series of different categories (e.g. news, entertainment, sports, films, TV, electronic games, animals, insects, science, geography, etc.) chosen from a menu on the hygiene device or apparatus. The hygiene device may also have facts and trivia categorized based upon a particular age group or different devices could be sold for particular age ranges. In other embodiments, one can change the type of information relayed to a user by the hygiene device by changing a memory component. The hygiene device could thus be changed from a trivia dispenser to a joke telling dispenser to an education dispenser by the simple act of putting in different memory/software cartridges.

An important part of keeping people interested in using the hygiene device and continuing to use it again and again is freshness of information. There are essentially two different ways of assuring that information remains fresh. One way is to use memory/software chips or modules which contain large amounts of information. The memory modules can be integral with the hygiene device or more preferably can be inserted and then later removed from the hygiene device to allow the use of different memory/software cartridges to keep information fresh. The second way of assuring that the hygiene device continues to provide users with fresh information is to have the source of the information remote from the hygiene device. In this latter case the information can be delivered to the hygiene device either using wireless technologies or by wired technologies such as cable.

For an essentially endless variety of information to be shared with a user the hygiene device may be connected (wired or wirelessly) to the Internet or other network. With billions of pages of information available on the Internet (and also images and videos) connection to the web over the Internet would result in an always fresh experience for a user of the hygiene device. On the other hand, because of the volume of information available when connected to the Internet it may be important to prevent information overload (especially since the desired time period of use is relatively short when using a hygiene device). Therefore it may be desirable for the hygiene device (or a computer in communication with the hygiene device) to utilize software that gives a user new information that comes in a form and size appropriate to the amount of time they should spend with the hygiene device (e.g. approximately 20 seconds with a soap dispenser and approximately 2 minutes with a toothbrush).

One such software service may be news reader software such as Really Simple Syndication (RSS) news. RSS news is a service which can be set up by a user to share only updated summaries of information from sites that are of interest to them. They may be of interest because they only focus on fresh news and they are given in bite size amounts of information that may correspond with the amount of desired time that should be spent with the hygiene device.

In certain embodiments, (e.g. a standard type residential soap dispenser), the electronics for the teaching device may be placed on the wall, or someplace else not potentially in contact with water. In one such embodiment, a soap dispenser or toothbrush triggers the teaching device by either wired or wireless contact with the teaching device. Either the connection from the hygiene device to the teaching device or the connection from the teaching device to the source of information (e.g. a nearby computer or server or a remote database over the Internet) may be wired or wireless.

It is possible that the teaching device or toothbrush may also help reinforce the correct hand washing or teeth brushing duration by telling or signaling to the user (audibly or visually) the minimum period of wash time necessary to kill the germs (e.g. approximately 15-20 seconds is normally recommended).

In various embodiments, the communication/learning or entertaining can be done by electronic voices, recorded human voices, electronic (or other types) of text messages, scrolling text messages, visual messages, actual video, (digital in at least one embodiment) and so forth.

Preferably the information being communicated to the user is interesting to them and therefore coerces them into using the hygiene device on a continual basis. When a soap dispenser is used to trigger the information delivery, it is preferable that the amount of information delivered should correspond with the desired duration (e.g. approximately 15-20 seconds) of the act of washing one's hands. (Likewise, the amount of information relayed in response to a tooth brush trigger can be much longer, since the desired duration of brushing one's teeth may be approximately 1-3 minutes).

The order of communicating facts, trivia, entertainment or other information can be done in a random way, (e.g. random within a particular category a user has picked or random between categories), to keep it interesting. Alternatively, information can be presented in a systematic way, to make sure the person is hearing new information. The information may also be delivered automatically to a user from the Internet with a software service that gives a user updates of information in bite sized formats from sites of interest to the user.

Some embodiments provide a soap dispenser or toothbrush that does not communicate with the user each time the dispenser pump is pushed or the toothbrush used. This dormant period is used to prevent, for example, a child (or employee) from standing all day at the wash basin, continually using the dispenser to learn new facts or be entertained. Accordingly, some embodiments provide a teaching mechanism/device designed such that there is some forced delay period between communication of facts/information/entertainment when the hygiene device is used. A soap dispenser for example, may still dispense soap during each use, but may not also communicate electronic information during each use.

For multiple child households, one may want to allow more than one communication quickly back to back, but then require a delay after the number of children in the household is matched. One such embodiment provides a switch on the soap dispenser or toothbrush base which allows the dispenser to be set to the number of users so that back to back washes with information are possible for X numbers of users. In institutional environments which utilize a radio frequency identification device (RFID) or other employee identification device the hygiene device may be designed not to allow multiple back to back uses of the device by the same employee. Such overuse could result in a waste of soap and also cut down on productivity.

In another embodiment of the disclosure, the information dispensed by the hygiene device may be only intermittent and/or may work like a lottery. For example, to generate excitement to use a soap dispenser in a commercial environment (e.g. in a restaurant or hospital) or in a residential environment the soap dispenser may be designed to intermittently declare that a user is a winner. The prizes can be anything as simple as a day off from work to a monetary prize. This lottery type dispenser can also be used to help keep track of employees (or children's) use of dispensers in a non-threatening, non-policing way. For example, each use of a dispenser could log in the employee with an employee identification number. This registering of the use of the dispenser by an employee may be done in a number of different ways.

In one embodiment individual identification may be done by using employee ID numbers. In this embodiment the employee may key in their particular employee number into the soap dispenser. One prior art patent describing such a system (but not including the lottery or information sharing) is described in U.S. Pat. No. 6,707,873 issued to Ecolab, which patent is incorporated herein by reference. Alternatively, the dispenser may use RFID technology or some other identification device (see FIG. 6) to track employee usage of a dispenser and log them into the "contest". The fact that a prize is involved may make this tracking of the use of the dispenser less negative from an employee (or child's) standpoint then monitoring of soap dispenser use solely to verify sufficient use of it (i.e. this embodiment uses monitoring as a carrot rather than a stick).

For businesses with multiple dispensers and/or locations it may be desirable to have the dispenser usage results fed into a central data base. This would allow for central management to track hygiene on a location by location basis and would also allow for potentially larger prizes to coerce use. For example, for a large restaurant chain it may be possible to have a company wide prize of many thousands (or even hundreds of thousands) of dollars a couple of times a year (or even more frequently). A significant cash prize would likely coerce use of the dispensers across the entire chain with a resulting improvement in hand hygiene. The prize may also be directed to an entire location as opposed to an individual to promote a team spirit of hand washing in their restaurants. The restaurant chain may even be able to advertise this new hygiene process to generate good public relations and improved market share.

In other embodiments, coercing use of the soap dispenser may be done through use of a recording device which records and/or displays information relating to use. User identification device such as RFIDs, biometrics, voice identification, input of an employee number and so forth may be used to distinguish between different users and to keep track of individual or location use metrics. Examples of information that might be displayed are frequency of use of the soap dispenser, and/or particular time a toothbrush was used. In this manner, for example, a parent or employer could, at the end of a day or week check how often a child or employee had used the teaching soap dispenser and the timing of its use. It could be used to see trends in hand washing or teeth brushing, and reward positive behavior and attempt to change insufficient hygiene practices. This information may also be useful to a parent or employer in monitoring use of the dispenser or other hygiene device.

Soap dispensing and other hygiene devices disclosed herein, or their equivalents, may be used, for example, in any situation where it is desirable that a person washes their hands or performs some desired hygienic action. Medical studies show that washing hands numerous times a day dramatically decreases illnesses. Accordingly, a soap dispenser may be used in various entrances or areas of a home or a business. Also, since a soap dispenser as disclosed herein can be used with non-soap cleansers that do not necessarily require rinsing or washing with water, (e.g. alcohol or antibiotic gels such as Purell from GOJO) the dispenser may be placed in areas not necessarily adjacent to a wash basin or sink.

One of the advantages of at least one of the hygiene device disclosed herein is that it is simple and inexpensive (or will become less expensive as electronic components and software continue to become cheaper and have more functionality) and can be easily placed anywhere in a home or business without changing existing fixtures or retrofitting. It is another technical advantage of various embodiments that use of the soap dispenser or toothbrush is coerced through use of the teaching/trivia/entertaining device.

Other technical advantages of the present disclosure should be apparent from the drawings and specification.

BRIEF DESCRIPTION OF THE DRAWINGS

A more complete and thorough understanding of the present disclosure and advantages thereof may be acquired by referring to the following descriptions taken in conjunction with the accompanying drawings, and wherein.

DETAILED DESCRIPTION OF THE DISCLOSURE

Figure 1:
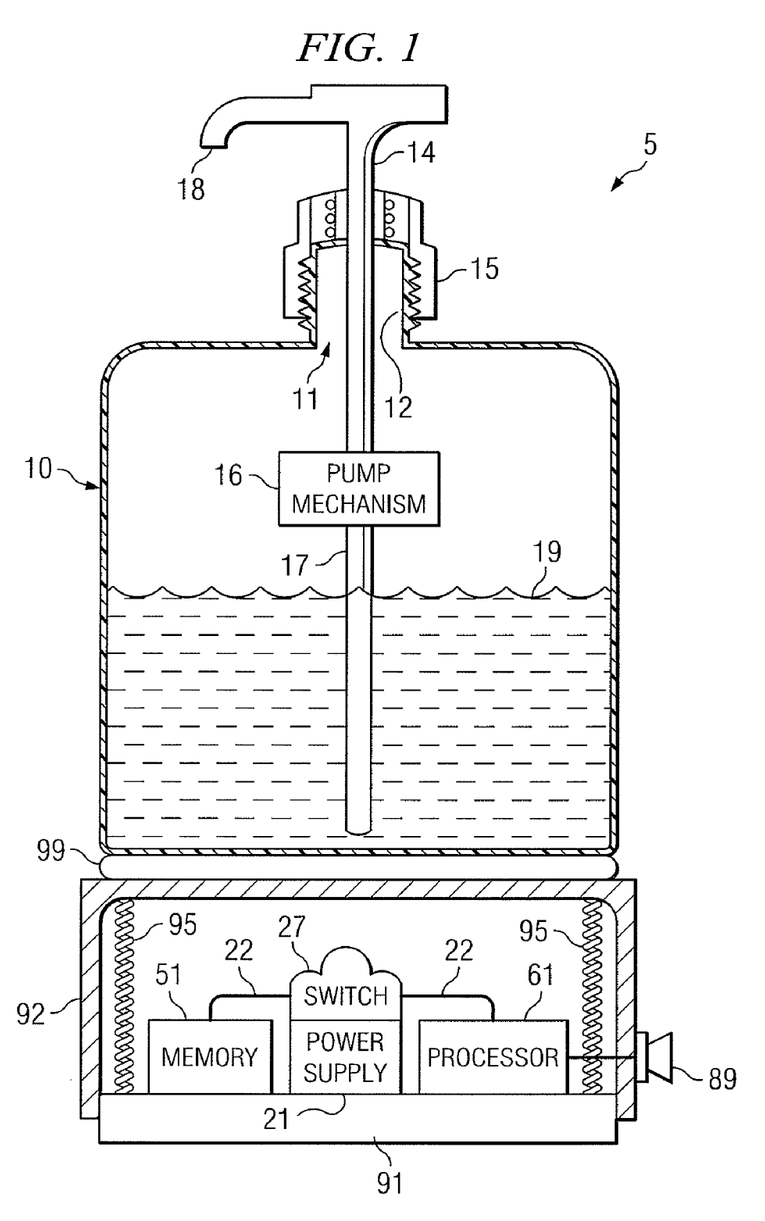
FIG. 1 is a cross-sectional view of one embodiment of a soap dispenser with a teaching device according to teachings of the present disclosure.

Referring to FIG. 1, a cross sectional view of an exemplary embodiment of a teaching soap dispenser 5 will be discussed.

In the embodiment of FIG. 1, the dispenser preferably comprises a container 10 for a liquid such as liquid soap or other personal health care liquid 19. Container 10 has an opening 11 defined by threaded male lip 12. Male lip 12 is designed to fit female threaded cap 15 so that cap 15 can be taken on and off so that container 10 can be filled or refilled with liquid soap 19. In other embodiments the container 10 is designed to be disposable, and is simply replaced, rather than refilled, after liquid soap 19 has been depleted. Thus, there is no need for a removable cap 15.

The dispenser is preferably, but not necessarily, designed to sit substantially flat on a surface such as a table, sink or counter. In some embodiments, container 10 may also be configured, although not expressly shown, to mount on a wall or other vertical surface such as a mirror. The mounting can be done simply, without retrofitting, by using such things as a suction cup on a mirror, or Velcro® type attachment means or other easily attachable/detachable means well known in the art (these attachment means may also be used with separate teaching devices as set forth in FIGS. 2-5).

The shape of container 10 may be varied. For example for use with children, it may be desirable to make container 10 in the shape of an animal or action hero.

Preferably inserted through opening 11 is discharge pipe/outlet/hose (discharge pipe) 14 which exits opening 11 through cap 15 and has exit hole 18 where the liquid soap 19 exits the apparatus and goes on a person's hand. Discharge pipe 14 is preferably movable up and down through cap 15 and is coupled with pump mechanism 16, which typically has a spring mechanism and plunger such as those used in liquid dispensers well known in the art. However, pump 16 may be any of many different types of pumps used to force liquids out of a container.

Pump 16 is also coupled with siphon/suction pipe 17. The up and down motion of discharge pipe 14 inside pump 16 preferably causes liquid soap 19 to be sucked into siphon pipe 17, then into pump 16 and ultimately through discharge pipe 14 and out through exit hole 18.

Those skilled in the art will recognize that there are many different ways of getting a liquid soap out of a container and onto someone's hands. Accordingly, the specifics of the type of hoses/pipes and pumps, or even gravity feeding used to get liquid soap or other hygiene fluids out of a container are unimportant to this disclosure. In fact there are soap dispensers that rely totally on electronic means to dispense soap on a person's hands, rather than using mechanical/pneumatic type pumps.

When a user operates dispenser 5 by contacting, pressing, pushing, compressing, hands free sensing, etc. the soap dispenser 5, the teaching/entertaining/informing function is triggered as well. This triggering of the teaching function can be done very simply in a wide variety of ways, known to those skilled in the art, since the teaching device is typically electronic. Consequently any button, switch, trigger, location readers, etc. will work. For example, various position sensitive switches, magnetic switches, contact switches, capacitive switches, or the like may be used without departing from the scope of the present disclosure.

Under normal operation, (i.e. when one wants to coerce use of the soap dispensers), it is preferable that the teaching function be made difficult or impossible to trigger without using the soap dispensers. In other words, a child or employee who wants to hear (or see) some new trivia, or other information, must use the soap dispensers. To generate even more excitement, it may also be desirable to have the lottery function included as described above. It is possible to use the information sharing either with or without the lottery function and vice versa the lottery may be used with or without information sharing.

In an institutional setting, this prize message could be designed to entice employee use by giving some amount of money to a randomly selected user of the soap dispensers. For a business, it may be worthwhile to give a significant amount of money on some infrequent basis to a random winner in order to coerce use and generate some excitement around dispenser use. In this "big prize" mode of use, it may be possible that the random winner message does not also require the trivia, entertainment, etc. on a continual basis to coerce use.

In some embodiments, an on/off button and/or a volume control are provided on the teaching/trivia/entertaining device to allow a user the option of using the soap dispensers with no noise output. This low volume or "off" option may be desirable in cases where the dispenser is located near an area where persons sleep (e.g. in a hospital room).

The electronics for teaching/entertaining or trivia communicating may comprise a memory/record keeping mechanism such as memory 51, processor/message generator means such as processor 61, a transducer such as speaker 89, and power supply 21. Memory 51 may include, but is not limited to, random access memory (RAM), electrically erasable programmable read only memory (EEPROM), masked ROM, compact flash memory, secure data memory, any of various commercially available microprocessors, including digital signal processors or the like. Commercially available audible chips with memory and speaking mechanisms incorporated together can be found from suppliers like Winbond out of Taiwan. Other suitable processors may also be used. The memory 51 and processor/message generator may be combined into one component on either a printed circuit board or a system on a chip (SOC).

In one embodiment, electronics for the teaching device may include switch 27, which preferably allows power to flow from power supply 21 to memory 51, processor 61 and speaker/transducer 89. Accordingly, switch 27 is preferably operable to selectively couple the various electronic components via one or more wires 22 or other electrical conduits. Switch 27 may be implemented using a variety of technologies including but not limited to contact switches, micro-electro-mechanical switches, pushbutton, toggle, slide, location sensors, RFIDs, as well as other switches. Note that other switches (not illustrated) may be positioned in other locations to detect use of the soap dispenser without departing from the scope of the present disclosure.

Processor 61 can be programmed such that it can do a wide variety of different things (in some simple embodiments no processor may be necessary). For instance, as discussed above, it is highly likely that parents will not want the soap dispenser to be used continuously by a child wanting to hear more facts/trivia or be otherwise entertained. Accordingly, processor 61 can be programmed such that its repeated use over a short amount of time will not result in repeated output from the dispenser. This will help ensure that continued pumping of the dispenser, for instance by a child, does not result in multiple back to back information outputs. Accordingly processor 61 may be programmed to not give off an additional messages/information unless some minimum delay period has elapsed since the prior triggering of switch 27. This delay could be, in one embodiment, between approximately 2-60 minutes. Other appropriate delay periods may also be used.

Processor 61 may also be programmed to randomly pick different messages from memory 51 so that a child does not often hear the same factoid/trivia repeated.

The soap dispenser 5 may have a category choosing means (not expressly shown) so that a user can choose a category of his choice. The category choosing means may utilize voice recognition software that allows the user to choose a category without touching the dispenser. Voice recognition and command means are well known in the art and are commercially available from a number of different companies such as Microsoft's Voice Command 1.5 and Dragon Naturally Speaking from Scansoft. This embodiment, which utilizes software which is designed for pocket PCs or computers may be more likely usable in a commercial soap dispenser as set forth below in FIG. 6. On the other hand, as semiconductor chips and software get cheaper and cheaper accordingly to Moore's Law it may be practical to put voice recognition capability even into relatively inexpensive residential soap dispensers.

The processor/memory may also be designed such that a question is asked and then a delay is allowed, (e.g. for the child to think about his answer before the answer is given). For instance, the message might say "Do you know how many legs a spider has?"

[delay period designed to make the total time approximately 15-20 seconds for a soap dispenser or approximately 2 minutes for a toothbrush]

"If you guessed 8 you were right."

Or the message might simply be declaratory as opposed to questioning,

"Did you know that a spider has 8 legs?"

Accordingly, this information sharing could also tell a person how long to wash their hands in addition to teaching/entertaining them. The delay causes the user to remain in the area and perform the desired task in order to hear or see the final answer or finish listening to or watching the entertaining information dispensed by the hygiene device. When the information dispensed is particularly fun or entertaining it may be desirable to turn off the dispensing functionality after some desired time (e.g. approximately 20-30 seconds after dispensing soap) in order to prevent the user from wasting time by remaining in the vicinity of the hygiene device being entertained.

Accordingly, in this mode, the processor may be programmed such that the message/information/video ends at the desired hand washing time (e.g. approximately 15-20 seconds or some other desired duration), so that the user knows that when the message/information is over it is also time to stop scrubbing their hands. This could be done very simply by the processor calculating the duration of the message to be communicated and subtracting this period from the total desired duration of hand washing. The time period could be the delay between the dispenser trigger and the commencement of the message/information. For example, if a desired hand washing time, including time for starting scrubbing after using the dispenser, is approximately 20 seconds, and a single declaratory type message is approximately 11 seconds long, then the message/information to be heard does not start until approximately 9 seconds after the dispenser has been used.

On the other hand, if the question/delay/answer scenario is utilized the processor would need to add up the total time of the two parts of the message and subtract this from the desired total time to find the delay period. For example, assume that a question takes approximately 5 seconds to ask and the answer requires approximately 2 seconds and the desired wash time is approximately 20 seconds. In this example, the delay period between question and answer would approximately 13 seconds (5 seconds +2 seconds minus 20 seconds=13 seconds). This delay could also help assure the desired hand wash time since the person is waiting (perhaps with anticipation) to hear the end of the message or answer to the question. During this period they are presumably standing there with soap (or other cleanser) on their hands. Since they want to hear, see or otherwise experience the delayed information, they might as well wash their hands as they are waiting (if the marking mechanism described herein is used they will in fact be forced to effectively wash their hands).

It is also possible that this time period could be reinforced by including a short statement at the end of the information sharing telling the user that the hand wash time period is now finished. For instance, in the example above, it might say, "If you guessed 8 you were right and you've also now washed your hands for long enough" or perhaps "times up . . . the answer is 8".

Alternatively, it may be preferable that the desired hand wash period is simply designated by speaker/transducer 89 giving off a beep or other noise showing the correct duration of hand washing, in addition to the factoids/trivia. Another alternative would be a light emitting diode (LED) or other indicator on the dispenser surface (not expressly shown) which either goes on or off or starts blinking when the hand wash duration has been met. The LED could also be designed such that it stays on (or blinks) for some extended period of time (e.g. a period longer than the user typically would remain in the dispenser area) after use of the dispenser so that a parent (or employer) may monitor use of the dispenser by entering the dispenser area at some period of time after the child (or employee) has used the dispenser.

In certain interactive embodiments (not expressly shown), the user may be able to actually press multiple choice buttons, or use voice recognition means to answer the question before the teaching dispenser answers the question itself. For hygiene reasons, if trivia answering buttons are used it may be desirable that they be designed not to be touched by the hands (e.g. touch free buttons with sensors, or foot pedal buttons, or large buttons for use with arms, elbows, etc.) or that the buttons be sanitized by frequent automatic cleaning, spraying or even immersion in a sanitary medium. In this interactive mode, the dispenser/teaching device may give off a signal showing that either the person got the right answer (e.g. a celebratory signal like a flashing light or applause) or alternatively, an incorrect signal (e.g. a flashing red light or one of the well known "wrong answer" audible signals). In either case the signal telling the user whether they got the answer right or wrong may also be used to tell them the desired amount of time to wash their hands. If the dispenser is used by multiple persons, and if a user identification device (e.g. RFID, voice recognition or biometrics) is used to identify specific users then it would be possible for the soap dispenser to actually conduct trivia contests which could be used just for fun or even to generate prizes as discussed above to coerce use of the dispenser.

As an example, in a restaurant scenario, the soap dispenser could be designed to keep track of the answers to the trivia questions for particular shifts or particular locations (if individual tracking is not practical) and therefore different shifts (or categories of people within a restaurant) could have competitions between themselves. These competitions would also be able to track the number of times the dispenser is used and this would allow management to reward shifts that were especially diligent in hand washing frequency or got the most answers right (e.g. Shift A answered approximately 200 questions on Monday and got 150 of questions correct). Since the tracking is done as part of a fun contest, management's tracking of the number of times the dispenser is used (i.e. approximately 200 times in the example above) is less likely to be seen as offensive (i.e. policing) to the users. The output from the trivia game/dispenser usage could be sent wirelessly to a remote computer (e.g. manager's computer) in order to keep track of results and do trend analysis.

It is also possible to add a display window which displays information recorded by recording mechanism (e.g. concerning information on use of the dispenser such as frequency and timing of hand washing). Such a display may include an organic light emitting diode (OLED) screen for non-flat surfaces, or any other suitable type screen.

The use of switches, power supplies, processors, and speakers and other means capable of generating sounds are known in the art, and as such various modifications may be made to the exemplary embodiment discussed herein without departing from the spirit of the teachings of the present disclosure. U.S. Pat. No. 5,810,201 discusses such speech generating mechanism and it is incorporated herein by reference in its entirety. Further, the Leap Frog/LeapPad® brands of teaching toys are commercially available means and methods of implementing electronic voice messages.

In the exemplary embodiment shown in FIG. 1, the electronic teaching system is situated below container 10, although other configurations are within the scope of the disclosure. For example, in one embodiment the electronics and soap container are in one integral unit as opposed to a potentially detachable base unit as illustrated. Referring to the illustrated example, however, it is the downward motion on pump/discharge pipe 14 that dispenses soap 19, and also triggers the teaching function. This occurs because switch 27 (or pressure sensor) is on top of power supply 21 and immediately below, the top cover of base cover 92. Since base cover 92 has the weight of dispenser 10 on it and since it is movable up and down with respect to base bottom 91, the weight of dispenser 10 will tend to push base cover 92 down onto switch 27. However, biasing mechanism 95, (e.g. springs or elastic material) keep base cover 92 from touching switch 27 in its unbiased position, (i.e. with dispenser 10 and contents on top of base cover 92). The same biasing mechanism 95 are designed to allow base cover 92 to contact switch 27 when a person presses on soap dispenser 10 to pump out soap 19 (or other cleanser).

Since a typical soap dispenser according to one embodiment weighs roughly between 1-3 lbs., depending on the amount of soap in the container, and since most soap dispenser units require roughly between 4-5 pounds of pressure on the pump mechanism to extract the liquid, it is possible to configure standard biasing mechanism (e.g. springs or elastic O-rings) for most commercial dispensers that will keep cover 92 off switch 27 until a person pushes down on the soap dispenser to pump out the liquid soap/cleanser. Trigger mechanism for wall mounted commercial soap dispensers are especially easy to trigger since it is easy to add switches, buttons, etc. to these units or to use the location/hand sensors in a touch free dispenser to trigger the teaching device.

Other switch/trigger mechanism are well known in the art and would fall within the scope of this disclosure. As an example, in order to allow a switch to be added to almost any existing pump activated soap dispenser one could use a magnetic switch (not illustrated), (e.g. a Hall Effect switch), which could be easily attached to a person's favorite soap dispenser and then connected either with wire or wirelessly to a separate information dispensing unit (see FIG. 2).

Once switch 27 is activated by a person using soap dispenser 5, the teaching device and/or recording mechanism may be triggered. In the configuration of FIG. 1 (where the base component is detachable from dispenser 10), it allows for a person to purchase the entire unit but then to swap out another soap dispenser to be used on top of the base unit. In other words, should a person not like the design or functionality of dispenser 5 (normally sold with the base) he can simply take dispenser 5 (container 10) off base cover 92 by detaching base dispenser attachment mechanism 99. Then, either reusing base dispenser attachment mechanism 99 or some other attachment mechanism, the user can place another soap dispenser on the base unit (bottom 91, cover 92 and the enclosed electronics). It is also possible to simply place the new soap dispenser on the top of base cover 92 and let gravity alone keep it in place on the top surface of base cover 92. It is not necessary that the new dispenser fit exactly on the footprint of the top of cover 92, so long as the top surface of cover 92 is roughly flat (e.g. the new soap dispenser can be either smaller or larger or have a different shape altogether, but still be placeable on the flat, horizontal top surface of cover 92). This is especially true if detachable attachment mechanism like two sided tape or Velcro® are used. In other embodiments, however, container 10 may be designed specifically to mate with cover 92 and this would allow easy replacement of a new container 10 should one run out of soap and refilling is not an option for the particular system.

Figure 6:
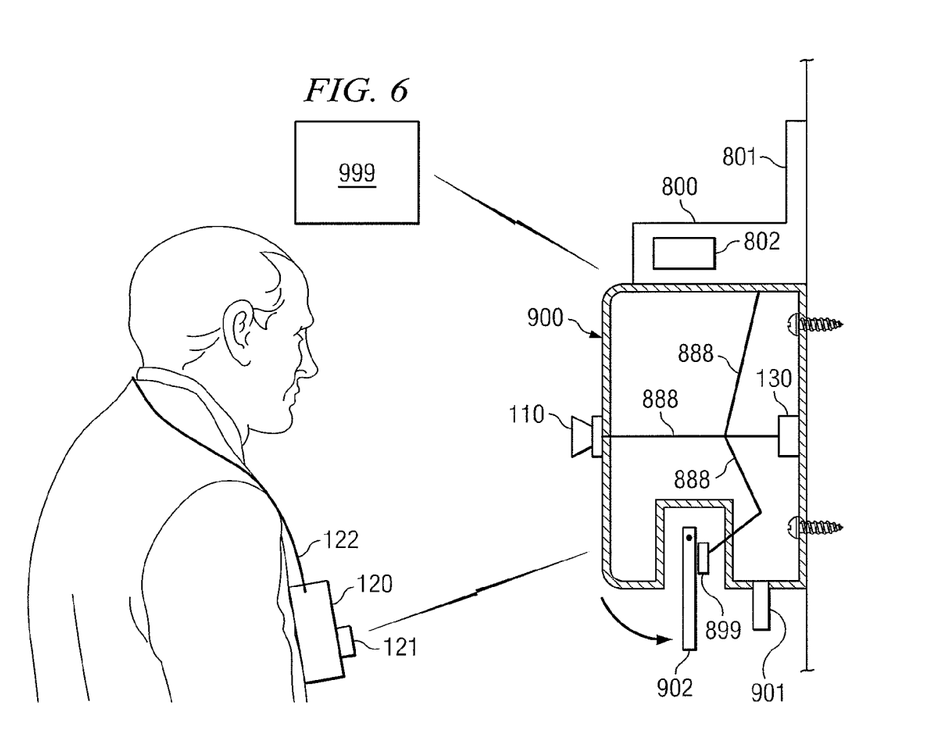
FIG. 6 is a cross sectional view of a wall hanging commercial soap dispenser according to one embodiment of the present disclosure.

Note that it is possible to configure the soap dispenser or tooth brush apparatus in a variety of ways depending on the desires of the end user. It could have only the teaching device which is triggered roughly concurrently with the dispensing of the soap; or it could also additionally have a recording mechanism (as shown in FIG. 6) to record use of the dispenser; or it could also have a marking mechanism (not expressly shown); or it could have any combination of these features so long as the teaching device is included.

Figure 2:
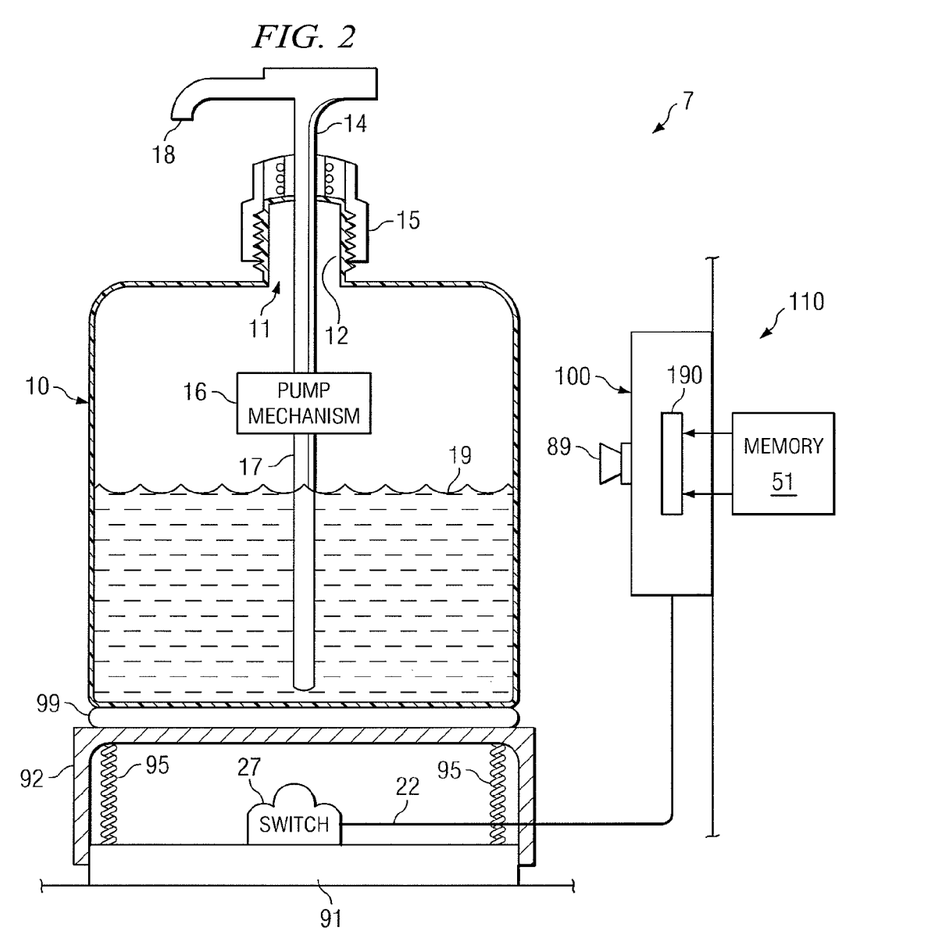
FIG. 2 is a cross-sectional view of another exemplary embodiment of the soap dispenser of FIG. 1.

FIG. 2 shows a similar dispenser to the one in FIG. 1, except that the electronics for the teaching device is located separate from the dispenser itself. This might be desirable for either space reasons (some wash basins are very small) or because a soap dispenser is typically located near a wash basin and contact or immersion with water could be a problem for the electronics of the teaching device.

In FIG. 2 dispenser 7 with container 10 sets on a base similar to the one shown in FIG. 1, except that the electrical components (except switch 27) are located in a different place. Switch 27 could be non-electrical in the base utilizing simple technologies such as pneumatic or mechanical methods. For example, switch 27 may be a bladder connected to an information dispensing unit 100 pneumatically via a tube (not illustrated). Alternatively, switch 27 may be a piezo electric switch that generates a small signal voltage that is transmitted to information dispensing unit 100 via a wire 22. Note that wire 22 may be any form of transmission medium suitable for transferring information which may be pneumatic, electrical, optical, or otherwise, from the soap dispenser base to information dispensing unit 100. In FIG. 2 the teaching device (which may contain all the electrical components as shown in FIG. 1) are contained within housing 100 which is detachably (or permanently) mounted on wall or mirror 110. On a mirror, it may be desirable to use a suction cup as the means of attachment since they are cheap, easy to use and do not leave any marks or residue on a surface. FIG. 2 shows switch 27 in communication with the teaching device in housing 100 through electrical wires 22. However, it may be desirable to have the communication between the dispenser and the teaching device done using wireless technologies well known in the art such as radio spectrum, infrared, Bluetooth, 802.11 x technologies, GSM (Global system for mobile communications) 3GSM, CDMA, TDMA and so forth. These same wireless technologies can be used to connect the teaching device to the Internet or remote data bases as shown below in FIG. 6.

As in FIG. 1, it may be desirable to have the base portion detachable from the dispenser portion. This allows potentially different dispensers to be used with the same base (as described above). In fact, the final product may be sold only with a triggering base and the teaching device so that a person may utilize a soap dispenser (e.g. container 10), of choice. In this embodiment the triggering base is designed such that a wide variety of different soap dispensers can be utilized with the base.

In one embodiment, housing 100 also includes a memory insertion slot 190 which is configured so as to allow memory 51 to be inserted and ejected from the teaching device electronics contained within housing 100. This insertion and ejection of different memory 51 allows the teaching device to be modified easily to communicate different types and categories of information.

As an example, one day memory 51 could include information focused on trivia for children approximately 5-7 years old, and the next day the informational soap dispenser 7 may be moved to the parent's bathroom, and memory 51 could be inserted to teach the parents new vocabulary or a foreign language. The use of different memory in the same apparatus by inserting and ejecting differing memory cards is well known in the art and be found in a variety of different types of apparatuses such as commercially available LeapPad® games, Game Boys®, iPods®, digital cameras and so forth.

Figure 3:
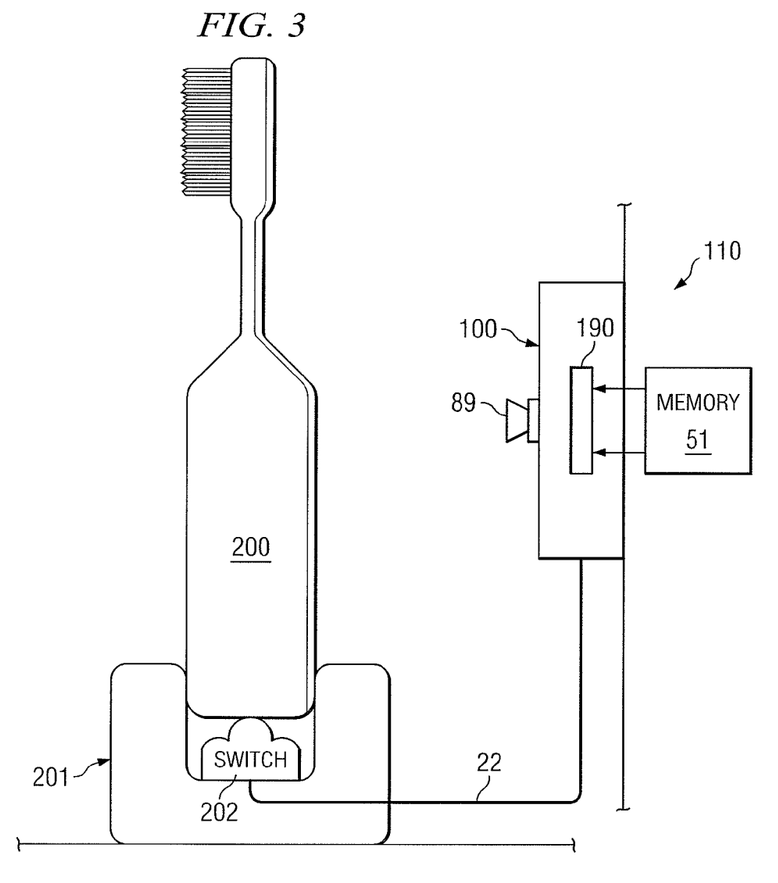
FIG. 3 is side view of a tooth brush and holder which triggers the same type of teaching device set forth in FIGS. 1 and 2 when the tooth brush is removed from its holder.
Figure 5:
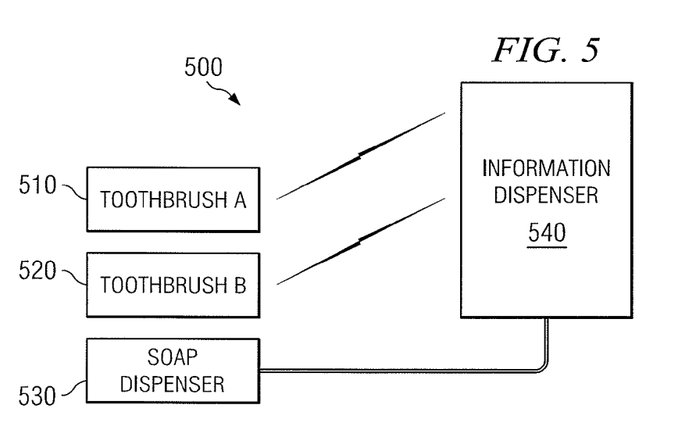
FIG. 5 is a block diagram of a network of hygiene devices used to provide information or entertainment according to an embodiment of the present disclosure.

FIG. 3 shows a very similar embodiment of the disclosure in use with a toothbrush rather than with a soap dispenser as shown in FIGS. 1-2. The use of the teaching device with this hygienic device may be triggered by the removal of the toothbrush from its container as opposed to pressure on a pump with the soap dispenser. As shown in an exemplary mode in FIG. 3, toothbrush 200 (which may or may not be electrical) normally rests within holder 201 when it is not in use. Holder 201 includes switch 202. When toothbrush 200 is removed from holder 201 this triggers switch 202 to communicate with the electronic teaching device using wires 22 (or wirelessly as shown in FIG. 5). The triggering of the teaching/entertainment device may also be triggered by the simple turning on of an electric toothbrush as opposed to the physical removal of a toothbrush from a holder (not expressly shown). In this mode where the electronics are contained within the toothbrush itself, it may be desirable to add a motion sensor such as those described in U.S. Pat. No. 6,029,303 which will not allow the teaching/entertaining device to function unless the toothbrush remains in motion during the desired tooth brushing period.

In FIG. 3, the interior of housing 100 containing the electronic teaching device is not shown but the electronic components may be identical or similar to the ones shown in FIG. 1. Such teaching/information sharing devices, etc. are well known in the art.

One difference in the use of the teaching device with a toothbrush rather than a soap dispenser is the fact that the recommended duration of using a toothbrush is up to approximately 1-3 minutes (normally a minimum recommended brush time is approximately 2 minutes) as opposed to the approximately 15-20 seconds of duration desired for washing one's hands. This longer duration gives the ability to communicate much more information with each use of the dispenser. This may allow types of information sharing which are not possible with the short duration of hand washing. For example, longer music clips, longer excerpts from TV shows or movies (using a small video screen as shown in FIG. 6) and other entertainment media may be possible and desirable with approximately 2 minutes or so duration.

In sum, the information sharing medium, content and timing (e.g. information packet size) is preferably appropriate to the hygiene task that triggered it. In other words approximately 2 minutes of song or video clip while using a soap dispenser may be inappropriate, but it may be desirable while brushing one's teeth. Likewise an information packet with only approximately 20 seconds duration may not be optimum for a toothbrush but be perfect for a soap dispenser.

Like with the soap dispenser, it may be desirable to let the information sharing/teaching/entertaining device 100 also work as a signal of the desired tooth brushing duration. Presenting information for the entire two minutes, however, can make the apparatus more expensive (if memory components rather than an internet connection are being utilized), since the amount of memory required to share information for approximately 2 minutes is 6 times longer than for approximately 20 seconds of hand washing. In cases where cost is an issue it may, therefore, be desirable to use shorter information sharing time periods which are preceded by relatively long delays during the initial period of brushing the teeth. This delayed gratification may actually work as an incentive to brush the teeth for the whole period since the user does not receive the information (e.g. entertainment or answer to a trivia question) until toward the end of the desired tooth brushing period.

Similar to the soap dispenser, it may be desirable to have a delay between giving new information after the use of the tooth brush. This dormancy or delay period may help prevent child or user from standing by the bathroom sink all day and using the toothbrush apparatus in order to get more information/entertainment. In fact, all of the various options and modes described for the dispenser apparatuses are also able to be utilized in a tooth brush configuration.

Figure 4:
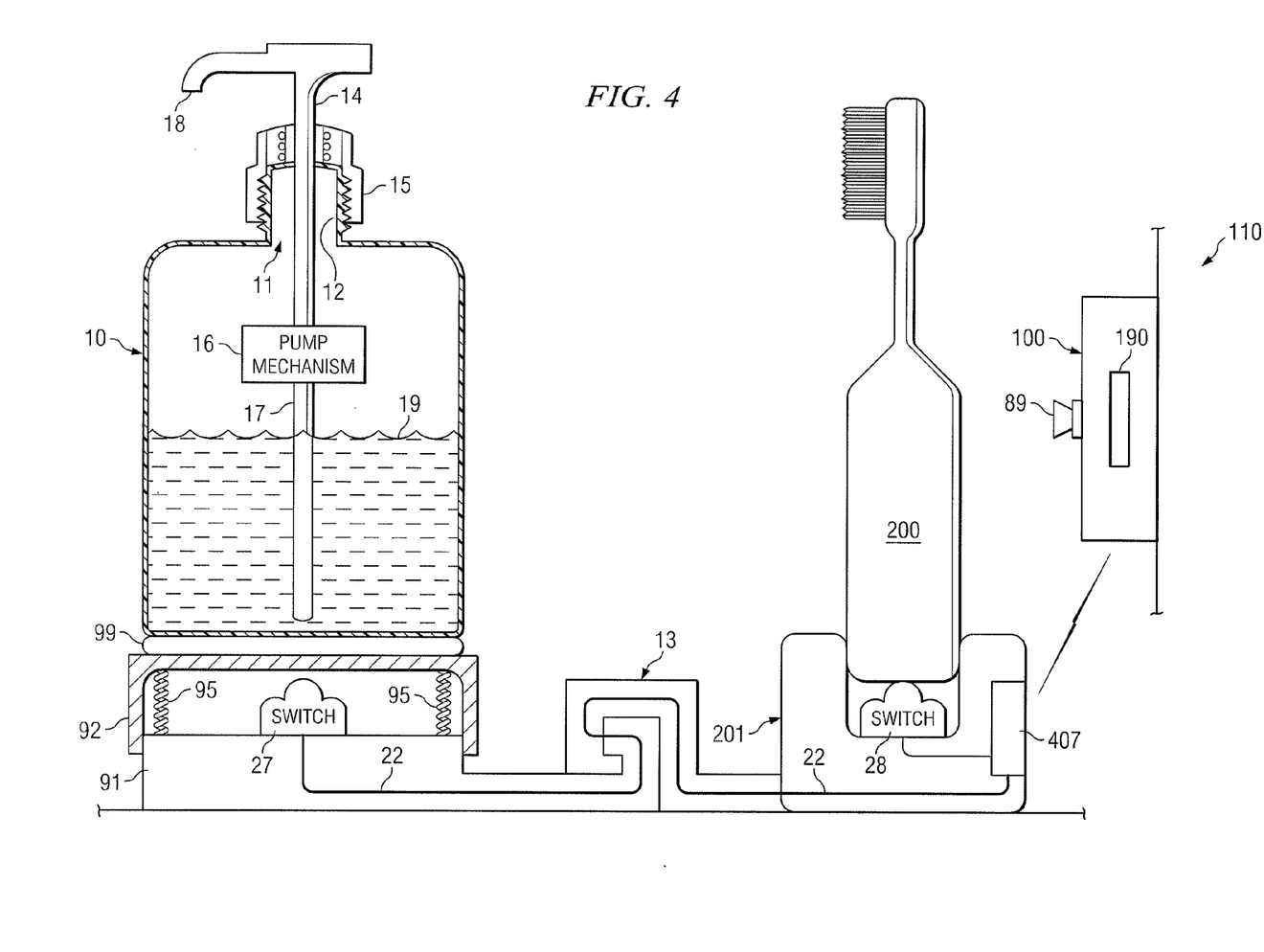
FIG. 4 is a side view of a combination soap dispenser and toothbrush holder according to an embodiment of the present disclosure.

Referring next to FIG. 4, an integrated base for holding both a soap container 10 and a toothbrush 200 is illustrated according to an embodiment of the present disclosure, and designated generally base 91. Base 91 includes an base cover 92 configured to hold a soap container 10. Biasing mechanism 95 hold top portion 92 so that switch 27 remains inactivated until a user dispenses soap by pressing down on soap container 10. A second switch 28 is provided in the tooth brush base portion 201 (which may be integrated into base 91 or detachably attached to base 91) under toothbrush 200 so that when toothbrush 200 is lifted out of base portion 201, a signal is generated. Note that in the illustrated embodiment, base 91 is divided into two portions which may be interconnected to provide a single integral base. A connector 13 is provided to make electrical contact between the two separate portions of base 91 when those separate portions are connected together. When a user dispenses soap from soap container 10 switch 27 provides an electrical signal to transmitter 407, which then wirelessly transmits an indication that switch 27 has been activated to the teaching device within housing 100. Likewise, when switch 28 is activated by toothbrush 200 being lifted out of the base portion 201, a signal is sent to transmitter 407 which then wirelessly transmits the indication to the teaching device held in housing 100.

It will be appreciated that transmitter 407 may transmit a different signal depending on whether switch 27 or switch 28 has been activated. By transmitting a different signal for the activation of each switch, the teaching device in housing 100 may provide information having different durations. So, for example, a relatively short packet of information (e.g. trivia) may be provided by the teaching device in response to switch 27 being activated, while a longer trivia question (or longer delay period) may be provided in response to switch 28 being activated.

In some such embodiments, speaker 89 is used to produce an audible question to a toothbrush user when toothbrush 200 is lifted out of its base 201. The answer to the trivia question may be delayed until near the end of the desired tooth brushing period, so that the toothbrush user has an opportunity to consider the possible answers to the trivia question. Such trivia questions may include multiple choice questions, fill in the blank questions, simple answer questions, or the like. In some embodiments, interactivity may be provided so that if a user answers a question prior to the tooth brushing period being over, a second question may be provided until the tooth brushing period has expired. During the approximate 2 minute time desired for brushing one's teeth there could be a series of such questions and if there is interactivity users could test them selves to see how many questions they can answer during the brushing period. This may transform the approximate 2 minute time period from one which seems way too long to one which seems too short as the user competes to get more answers correct before the time period ends.

It should be appreciated that although a single base with separable parts is illustrated in FIG. 4, other embodiments may include an integrated base with non-removable sections, separate toothbrush and soap dispenser bases that are not connectable, bases with multiple toothbrush holders and/or multiple soap dispenser bases, or the like.

Referring next to FIG. 5, a block diagram of a teaching system including various hygiene devices is illustrated, and discussed according to various embodiments of the present disclosure. System 500 includes toothbrush A 510, toothbrush B 520 and soap dispenser 530. System 500 also includes information dispenser 540, coupled to the soap dispenser 530 via a pneumatic line, an electrical line, or some other connection method. Toothbrush A 510 and toothbrush B 520 may be coupled to information dispenser 540 wirelessly, using any of various wireless technologies, including various spread spectrum, time division, frequency division or other suitable wireless technologies known to those skilled in the art.

In one embodiment, by providing both wired and wireless connections to information dispenser 540, multiple hygiene devices can be used, with each hygiene device placed either locally or remotely, as convenient to its user. Furthermore, different hygiene devices may allow different information to be provided to different users depending on the type of hygiene device being used and/or any of various user settings set according to the user type. So, for example, if toothbrush A 510 is used by a 6-year old, trivia and information suitable for a 6-year old may be provided during the entire period of tooth brushing at the beginning of the period of tooth brushing, at the end of the period of tooth brushing, or any combination thereof.

Likewise, if toothbrush B 520 is used by an adult, information dispenser 520 may provide linguistic improvement information, vocabulary improvement information, various audio or video entertainment suitable for an adult, or otherwise. If it is likely that soap dispenser 530 may be used by both adults and children, information dispenser 540 may provide information suitable for any family member, such as general trivia, music, or the like.

When implemented in an industrial or corporate setting, information dispenser 540 may be used to dispense information such as that normally circulated in memoranda. So, for example, an employee using a soap dispenser 530 may be informed of upcoming office closures, times and dates of an upcoming office party, or be provided an incentive by receiving information not provided to individuals not using the soap dispenser 530. In this way, if an employee perceives the information received from soap dispenser 530 is valuable and potentially not available unless that employee washes his hands, system 500 can be used to increase the likelihood of compliance of various corporate hand washing policies.

FIG. 6 shows a side view of a commercial wall hanging soap dispenser showing one embodiment of the disclosure.

(The electronics described specific to FIG. 6 could also be utilized in a toothbrush system or residential soap dispenser system. Dispenser 900 may be designed to hang on a wall and the liquid soap or cleanser may be dispensed from discharge 901 when a user pushes lever 902. There are many ways of dispensing soap from a wall mounted dispenser (including touch less dispensers like the "One Shot" from Technical Concepts) and the mode of causing the soap to dispense is unimportant to the scope of this disclosure. In this particular embodiment, when lever 902 is used to dispense the soap it also hits trigger 899 which is connected using wires 888 to computer 800. In the embodiment shown in FIG. 6, computer 800 is integral with dispenser 900 but in other embodiments (not expressly shown) the computer may be separate from dispenser 900 and coupled to it either by wire or wirelessly. Computer 800 can be any of a large number of different types of electronic devices which allow for handling and/or processing of digital data. It includes but is not restricted to devices such as PCs, cell phones, PDAs and so forth. Computer 800 does not necessarily require all the standard components of a typical personal computer. In certain simplified embodiments computer 800 may be simply a microprocessor, a microcontroller, a digital signal processor (DSP), an application specific integrated circuit (ASIC), a field programmable gate array (FPGA) or any other digital or analog circuitry configured to execute processing instructions.

The soap dispenser may further include power mechanism 130 (e.g. an energy storage cell, battery, fuel cell and so forth) that provides power to the various electronic components using wires 888. Power mechanism 130 may be internal or external to the dispenser such that the electronic components (e.g. computer 800 and sensor 110) receive power needed to operate. If power mechanism 130 is a battery, the dispenser may include a life indicator associated with power mechanism 130 that provides information about the amount of charge remaining in the battery. It may also be possible to simply plug the dispenser mechanism into a wall socket to get AC power so that battery power (and the resulting replacements or recharging) is not required.

In one embodiment computer 800 is designed to have access to the Internet or another network. This connection/communication can be done in a variety of different ways. In the embodiment of FIG. 6, computer 800 may be connected wirelessly to remote server 999 (or remote computer 999). This wireless connection to remote server 999 allows computer 800 to communicate essentially limitless digital information from the Internet or other networks. In addition to a wireless connection to server 999 the connection may also be done with a wire connection such as a cable modem or telephone line with DSL connection (not expressly shown). The wireless connectivity to the Internet shown in FIG. 6 may be accomplished through any of a number of different standards well known in the art such as radio spectrum, infrared, bluetooth, 802.11 x technologies (e.g. WiFi), GSM (Global system for mobile communications) 3GSM, CDMA, TDMA, WiMAX, and so forth.

A wireless configuration may be preferable since it would easily allow a number of different soap dispensers or other hygiene devices to be connected to a single transmitter or transceiver. Such wireless transmitters are well known in the art and are commercially available (e.g. the Truemobile 2300 from Dell). In some cases, the transmitter could connect to a server or a computer. The server or computer could be located locally in the home or business or it could be remote. For example, the restaurant manager's office computer may come with a WiFi transmitter (or other wireless transmitter) which may transmit information to one or a series of soap dispensers in the restaurant. Likewise, a parent's computer in a home with Internet connectivity could wirelessly transmit information to one or a series of residential hygiene products coupled to computers or mini-computers to coerce use of the hygiene device(s). Likewise, the hygiene devices could be connected directly (wired or wirelessly) to a remote server or computer such as server 999 in FIG. 6. Finally, it is also possible that individual hygiene devices may communicate wirelessly with other individual hygiene devices (or some other wireless network nodes) as part of a mesh network (also known as a peer to peer network). In this mesh network configuration, at least one of the individual hygiene devices communicates with a server or computer which has the information of interest.

In FIG. 6, computer 800 also may include screen 801 which allows for visual display of information from computer 800. Screen 801 is shown in FIG. 6 to be attached to computer 800 but in certain embodiments it may be desirable for the screen to be placed someplace other than with the soap dispenser. For example, organic light emitting diode (OLED) flexible screens may be placed on a non-flat surface for easy installation. In one embodiment it may be desirable to have the screen directly over the wash basin for ease of viewing. There are a wide variety of screens and remote computer screens commercially available. Computer screen 801 allows for a wide range of different types of visual information (textual, pictures, video, etc.) to be displayed, including but not limited to information stored in the computer's memory or information transmitted to the computer over either wired or wireless connections such as information from the Internet. It may also be desirable in certain configurations to have a hygiene device without a screen. In this case the information sharing may be done by using audible components such as speakers and/or transducers.

In addition to screen 801, computer 800 also has speaker 802 which allows for audible information (the spoken word, music, etc.) to be shared with a user. Using both screen 801 and speaker 802 allows for computer 800 to communicate a vast array of different types of digital content (including traditional media content) to a user of dispenser 900. Types of digital information which may be communicated include sounds, pictures, music, video, textual information, combinations of the above and so forth (e.g. anything that can be done with a computer, PDA or mini-computer can be done with this innovative hygiene device).

A basic question to be answered by a manufacturer of the hygiene device disclosed herein is what kinds of digital information would be most likely to coerce people to use their particular hygiene device? If there is only one or a couple of users of a particular hygiene device (e.g. in a residential environment) then designing memory chips to accommodate this limited population may be relatively easy. However, if a larger number of people will use the device (e.g. numerous employees in a restaurant) then this raises a more difficult question. In such an environment with multiple users it may be hard to find a single memory cartridge (or even multiple cartridges) which everyone or most people in the larger group like.

In sum, it is likely to be difficult to find universally interesting content for a large group of users by using solely memory chips (e.g. a computer's hard drive or memory storage devices). This is true even if it is assumed that one is utilizing improved memory chips embedded with huge amounts of different digital information. This is not to say that with enough memory one can't find or design digital content which is popular to most people and gives them enough variety to stay interested. But the challenge is difficult. Possible examples of widely popular digital content include trivia, jokes, pop music clips, video clips from popular movies and TV and so forth.

The ultimate solution, however, to assuring that each employee/user of the soap dispenser is getting information of interest to them individually is to let each individual choose what kind of information they prefer to experience when they utilize the dispenser or toothbrush. This requires an almost unlimited source of information and constant updating to assure freshness of information. This type of unlimited, updated and personalized access to information and entertainment is available through the Internet.

Simply connecting a hygiene device to the Internet and giving it access to the Internet is helpful but not optimum. This is because surfing the web can result in information overload and accordingly it may be a very time consuming endeavor. This time consumption is not consistent with the use of hygiene apparatuses such as soap dispensers or toothbrushes which are normally used over a relatively short period of time. Accordingly, what is desired is a way of identifying a particular user of the hygiene apparatus as it is used and then packaging and presenting information of interest to each user individually. With this highly personalized system of information sharing, use of the soap dispenser should become more frequent with a resulting improvement in hygiene.

Identification of particular users can be done in a number of ways as discussed above, including RFIDs, badges, employee ID numbers (which might be input on computer 800's keyboard), voice recognition, biometrics and so forth. As illustrated in FIG. 6, specific users may be distinguished by using sensor 110, which may be designed to detect whether a user is wearing, is attached to or is in proximity to some distinguishing characteristic such as electronically distinguishable device 121. For example, sensor 110 may be able to detect whether electronically distinguishable device 121 is within some desired distance (e.g. between approximately zero to ten feet) from the soap dispenser. In this example, all employees of the restaurant may have an electronically distinguishable device 121 (e.g. a RFID device) embedded in their name tags, wrist bands, clothing or even sub-dermally. As shown, name tag 120 may be attached to a user with band 122 (or alternatively pinned on clothing) and may include electronically distinguishable device 121. In another embodiment, sensor 110 may be a biometric sensor (not expressly shown) that distinguishes between users by using fingerprints, irises or other biometric features (e.g. see U.S. Pat. Nos. 6,206,238 and 5,960,991).

Sensor 110 may be connected to computer 800 using either wired or wireless connections. In FIG. 6 the connection from sensor 110 to computer 800 may be provided by wire 888. Sensor 110 may communicate with computer 800 and inform computer 800 which particular employee is currently in the immediate vicinity or is actually using the dispenser. It may be desirable that whenever sensor 110 senses an employee in the immediate area it communicates with computer 800 to begin the process of searching for and downloading the information to be presented to the specific employee. This searching and downloading process may occur even before the employee/user activates the hygiene device so that time delays in presenting the digital information are less of a potential issue. However, it may desirable that even if the employee specific information is available from computer 800 that the actual presentation of the information does not occur until the employee uses the dispenser (e.g. the employee presses lever 902 which contacts trigger/button 899 which then communicates with computer 800). This delay in presenting the information to a user who was previously identified by sensor 110 until the user has activated the dispenser prevents users from bypassing the hygiene step. Also the delay may be desirable if the presentation of information from computer 800 is designed to last for a time period consistent with the hand washing process. In other words, it may be desirable that the approximate 20 second display of information should not start prior to the soap being on the user's hands.

Each time an employee uses the dispenser (or is in the immediate vicinity) sensor 110 reads his RFID tag (or he keys in or says his employee number) and the dispenser recognizes the employee and signs him onto the computer. The record keeping functions discussed previously may also be used effectively in conjunction with electronically distinguishable device 121 (or biometrics) in order to track use of the soap dispenser by certain individuals. For example, with RFID devices designed to distinguish between particular items/people (e.g. an electronic badge as described in U.S. Pat. No. 5,610,589, which is incorporated herein by reference), the dispenser of FIG. 6 could keep records and show trends concerning specific use of the dispenser by particular users (e.g. restaurant employees and/or doctors and nurses). The information recorded may include, but is not limited to, the identity of the user, the time of use by the identified user, the frequency of use by the identified user during a certain period of time (e.g. the user's shift) and the location of the dispenser used by the identified user.

One example of a commercially available system that monitors hand washing using employee badges and reporting software is the iHygiene System manufactured by Woodward Laboratories. The iHygiene System is a touch-free soap dispenser that includes a wireless monitoring system to communicate with wireless communication enabled badges. The system stores time and date stamped hand washing hygiene compliance statistics that allows hygiene compliance to be tracked by site, shift, time of use, personnel, etc. Although a specific monitoring mechanism has been described, the use of monitoring mechanisms in commercial dispensers are known in the art and as such various modifications may be made to the exemplary embodiment discussed herein without departing from the spirit of the teachings of the present disclosure.

In addition to monitoring employee usage, the computer can be easily programmed to give each employee information specific to them which they find interesting or entertaining. An example of an easily personalized web site that gives a person access to a variety of updated information of interest to them is myYahoo. Using this Yahoo supported service it is easy for a person to personalize a web page which may at a glance give them updated information on a variety of different subjects such as the weather, stock quotes from their portfolio, news updates, sports updates, entertainment updates and so forth. For employees who may be uncomfortable designing their own personalized web site or information flow portfolio, computer 800 can utilize a default portfolio of popular web sites such as the generic Yahoo homepage.

The information may be either already residing on the computer (e.g. in its memory) or the computer may simply download the information from the Internet or some other remote data base using its wireless connection. Wireless connections in computers and PDAs are well known in the art (e.g. Intel makes a wireless chip called the Centrino®).

In addition to personalized web sites such as myYahoo, there are some commercially available software programs which are designed to give personalized information or entertainment in constantly updated and abbreviated/summarized formats. This constant updating of information important so that the information remains fresh for the user. An abbreviated/summarized format is important because with a soap dispenser it is desirable to have the entire information sharing process occur during the hand washing period which normally should last only about 20 seconds. Preferably the shared information may be packaged and presented such that it helps the employee/user know how long to wash their hands. In other words it may be desirable that the computer cease the flow of information (e.g. the screen goes dead or the speaker ceases making noise) at the end of the desired time period. It may also simply give off an audible or visual signal that the hand wash time is complete. To accomplish this abbreviated sharing of information in a way which is not frustrating for the user, the packets of entertainment or information would preferably be presented such that they lasted only during the desired duration of the hygiene process (e.g. approximately 20 seconds for hand washing). In this way, the employee/user is not only partially through reviewing the digital information sharing when they are cut off from the information.

Commercially available software programs called news readers can find and fetch updated dispatches and articles (e.g. new information of interest to a person) from a great variety of web sites. For example, Really Simple Syndication (RSS) news allows a person to pick certain web sites of interest and then the RSS news software constantly (perhaps once an hour) updates itself with new items from those chosen web sites. Many different types of web sites have RSS capability (e.g. news sites, blogs, online writers, etc.) and they can be found by utilizing any of a number of different news reader programs (also called "news aggregators") such as Newzcrawler, NetNewsWire and Radio Userland.

Using one of these programs an individual can chose from a directory of literally thousands of web site choices which contain RSS ("Rich Site Summary") tags. RSS news utilizes XML which is a more powerful version of HTML. Once a user signs up and subscribes to certain sites then each time the user signs on (e.g. in the embodiment of FIG. 6, uses the soap dispenser or is identified by sensor 110) a directory pane lets the user see an updated summary of headlines from his favorite sites. Within each channel the user will typically see a half dozen headlines and summaries. As noted, the software, importantly, presents the information in bite size summaries of the new postings so that the individual can review them quickly—an important issue considering the brief period of use associated with the particular hygiene device.

Since RSS news utilizes XML it is possible that computer 800 could utilize VoiceXML which is non-proprietary web based mark up language for creating dialogues between humans and computers. This would allow computer 800 to use a VoiceXML interpreter to render VoiceXML documents audibly using speaker 802. For environments where reading text from a screen may be difficult this audible feature may be desired. There are a large number of podcasts or audioblogs which are available on the Internet and this audible portfolio of information should continue to increase.

As an example of how this might be used by an actual restaurant employee, imagine a fictitious employee who has moved to the big city from Chippewa Falls, Wis. This employee is very interested in news from back home and he may also be fanatical about University of Wisconsin sports. The soap dispenser of this invention would allow him by using computer 800 (or the restaurant manager's computer) to set up an RSS news portfolio that would give him constant updates from the Chippewa Herald newspaper and a blog site which focuses on University of Wisconsin sports programs.

While the RFID may as a side benefit monitor employee usage of the dispenser, it may be described to the employee primarily as a means of personalizing their information feeds. This positive versus policing reason for tracking use may be helpful in gaining employee approval of individual monitoring.

In one embodiment of the invention the information sharing soap dispenser as shown in FIG. 6 could be used as an advertising tool. This is especially true if it is placed in the restroom areas used by their customers. In such an environment the invention could be used to try and generate more revenue for the restaurant (or some other business). This could be done by pushing particular products of the establishment (e.g. the dispenser may generate an updatable message which reads that "All lobster products are 40% off today"—as the manager realizes he has a lobster inventory issue). Advertising tools that are dynamic and can be changed quickly as a business faces new conditions are in great demand. For example, some billboards are now electronic and their messages are quickly able to be changed. These billboards demand higher fees because of this capability.

Accordingly, and perhaps even more importantly, an advertising soap dispenser may also work with third party advertising. Advertisers love a captive audience. There may be few better places to put advertising content (perhaps linked with a popular Internet site) then on a restroom soap dispenser. This concept is already being practiced in restrooms where advertisers are paying money to put their ads over urinals. However, such urinal or wash basin ads are static and not easily changed as circumstances change. With an Internet enabled dispenser, advertisers would not only have a captive audience but they also could instantaneously update their advertising message as needs change (e.g. the clothing store adjacent to the restaurant may advertise that they have a special on umbrellas that is run on every rainy day).

In certain circumstances (e.g. in public areas) the information sharing soap dispenser may be solely intended to advertise to people and the desire to improve hand washing is, if anything, an unintended consequence of this advertising soap dispenser. On the other hand, an RFID equipped soap dispenser in such a restroom bathroom may be intended to both improve employee hand washing (as described in detail above) while also advertising to the general public and/or the employees as well.

The various embodiments set forth in FIGS. 1-5 may also be utilized by the commercial dispenser or FIG. 6, including functions such as a Pavlovian signal and the delayed signal of use.

Finally, when the Internet enabled device of FIG. 6 is used in the embodiment of a toothbrush, larger (e.g. longer lasting) packets of digital information may be able to be shared with the user. As an example, a toothbrush user each morning could review his e-mails before going to work as he simultaneously reviews the news headlines from overnight. This turns what may normally seem to be a long "dead time" (e.g. tooth brushing duration) for a harried person into a multitasking opportunity where they are being entertained or informed. Accordingly they are much more likely to actually brush their teeth for the desired period.

In much of the previous discussion, the term "teaching device," "teaching apparatus," "information sharing device", "computer" and the like have been used to refer to a system used to dispense information. Such information may be educational, entertaining, news or some combination of entertaining and educational information, as desired. The digital information may be described as being shared in "packets" of digital information. "Packets" may be broadly defined as any of a number of different kinds of combinations of digital information in forms such as text, pictures, video, sound, combinations of these and so forth. Regardless of the exact type of information dispensed, however, the term "teaching device" and its derivatives are meant to encompass multiple types of information including educational, informative and entertaining information, and are not limited to simply teaching information. Furthermore, although soap dispensers and toothbrushes have been discussed primarily herein, other types of hygiene devices or other appliances (e.g. a stove, refrigerator, etc.) which may benefit from information sharing may incorporate the techniques disclosed herein without departure from the spirit and scope of the present disclosure.

Persons skilled in the art may realize that recording mechanism and memory discussed herein may be implemented using a variety of different technologies, including without limitation, one or more of the following: IC, ASIC, EEPROM, memory and processor combinations, mechanical counters, as well as others. With integrated circuits getting cheaper and cheaper as Moore's Law drives down semiconductor costs, it is possible that a great of variety of different types of information may be cheaply collected, stored and displayed.

It is also be possible with the dispenser of the subject disclosure to include a marking mechanism (not expressly shown) on the dispenser to assure that the user does a good job of washing his hands. This happens because the marking mechanism puts an easily identifiable substance on the user's hand which does not come off unless they wash their hands effectively. The marking mechanism and easily identifiable substance can be chosen from any of a number of different systems set forth in U.S. Pat. Nos. 6,147,607; 6,211,788; and 6,031,461 which are incorporated herein by reference in their entirety. The marking mechanism on the soap dispenser (e.g. an absorbent pad or spray apparatus) may be placed on the pump of the teaching soap dispenser. When a user pushes down on the pump the easily identifiable substance marks their hand and they are forced to do a good job of washing their hands (e.g. the easily identifiable substance only comes off the hands if they are washed with soap and water for a minimum period of time) or the failure to wash their hands is obvious. As an example the easily identifiable substance (e.g. Turquoise 1-7054 ink 203-52 from Ranger Ink) may be placed on a felt nib such as those available from American Felt & Filter Company and the nib with the ink may be placed on the contact portion of the dispenser pump to mark the user's hand.

Although the present disclosure has been described with respect to a specific preferred embodiment thereof, various changes and modifications may be suggested to one skilled in the art and it is intended that the present disclosure encompass such changes and modifications.

I claim:

1. A hand hygiene apparatus intended to be used by multiple different persons that provides entertainment during use, comprising:
   a hand sanitizing apparatus;
   an identification device interfaced with the hand sanitizing apparatus, the identification device operable to identify an individual user of the hand sanitizing apparatus; and
   an information sharing device interfaced with the hand sanitizing apparatus, the information sharing device operable to communicate a large variety of information selected by the identified user of the hand sanitizing apparatus in order to encourage more frequent use of the hand sanitizing apparatus.

2. The hand hygiene apparatus of claim 1 wherein the information informs the user of a minimum time period for use of the hand sanitizing apparatus.

3. The hand hygiene apparatus of claim 1 further comprising memory associated with the information sharing device, the memory operable to store the information communicated to the user.

4. The hand hygiene apparatus of claim 1 further comprising a remote computer interfaced with the information sharing device, the remote computer operable to store the information communicated to the user.

5. The hand hygiene apparatus of claim 4 wherein the remote computer communicates with the information sharing device over the Internet.

6. The hand hygiene apparatus of claim 5 wherein the information sharing device allows the user to select the information from a plurality of web sites.

7. The hand hygiene apparatus of claim 1 wherein the information comprises a plurality of packets including digital information.

8. The hand hygiene apparatus of claim 1 wherein the identification device comprises a radio frequency identification device (RFID).

9. The hand hygiene apparatus of claim 1 wherein the identification device comprises a voice recognition device or other biometric device.

10. The hand hygiene apparatus of claim 1 wherein the information shared with the user is trivia.

11. The hand hygiene apparatus of claim 4 wherein the computer keeps records of hand washing frequency.

12. The hand hygiene apparatus of claim 1 wherein at least some portion of the information is advertising information not necessarily chosen by the user.

13. A method for entertaining a user of a hand sanitizing apparatus intended to be used by multiple persons, comprising:
   providing an information sharing device operable to be interfaced with the hand sanitizing apparatus;
   identifying an individual user of the hand sanitizing apparatus using an identification device interfaced with the hand sanitizing apparatus;
   receiving an activation signal at the information sharing device when the hand sanitizing apparatus is used; and
   communicating from the information sharing device to the identified user after receipt of the activation signal a large variety of information selected by the user in order to encourage more frequent use of the hand sanitizing apparatus.

14. The method of claim 13, further comprising informing the user of a minimum time period for use of the hand sanitizing apparatus based on the activation signal.

15. The method of claim 13, wherein the information sharing device is operable to interface with the Internet to communicate information to the user.

16. The method of claim 15, further comprising updating the information communicated to the user by using a news reader program.

17. The method of claim 13, wherein the identification device comprises a radio frequency identification device (RFID).

18. The method of claim 13 wherein the identification device comprises a voice recognition device or other biometric device.

19. The method of claim 13, wherein the information comprises an advertising message.

20. The method of claim 19 wherein the advertising is targeted to the user.

* * * * *